June 10, 1958  J. EISENHOFER ET AL  2,838,049
SCALPEL
Filed Feb. 28, 1956
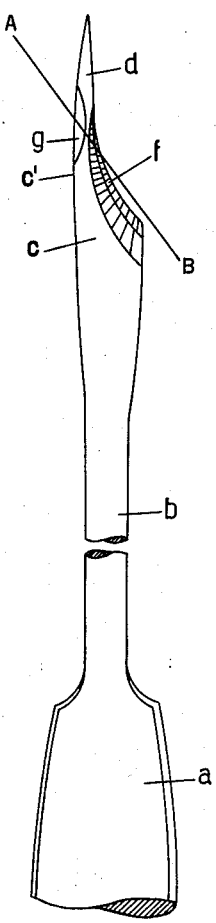
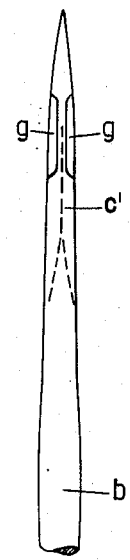
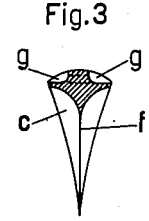
INVENTORS
JOHANN EISENHOFER &
LEO HORBACH
BY
ATTORNEY

United States Patent Office 2,838,049
Patented June 10, 1958

2,838,049

SCALPEL

Johann Eisenhofer, Munich, and Leo Horbach, Aachen, Germany

Application February 28, 1956, Serial No. 568,314

Claims priority, application Germany March 7, 1955

2 Claims. (Cl. 128—305)

The lancing of abcesses and other purulent areas as well as the removal of splinters or other foreign bodies from the skin by means of the customary scalpels is very painful owing to the unvoidable cutting pressure to be exerted by the blade on the inflamed area from the outside inwards.

This evil is largely overcome by the scalpel according to the invention, the blade of which has a cutting edge extending substantially in the direction of the longitudinal axis of the scalpel along a concave, partially oval line and is prolongated into an extremely fine needle-like point into which the cutting edge merges gradually.

In addition the present scalpel has at its back somewhat opposite the area where the edge merges into the point one or more longitudinal grooves serving as channels through which blood and pus can drain away.

The extremely fine point can be inserted with so little pressure that the incision is virtually painless and owing to the concave shape of the blade edge, the incision can then be easily extended, cutting from within outwards and thus avoiding any further pressure on the inflamed area. The grooves through which blood and pus can drain away freely provide for an immediate relief of tension and increase the space available for manoeuvering the scalpel. The shape of the blade and the possibility of cutting from within outward enables the incision to be made with the minimum of damage to the subcutaneous tissue, thus ensuring an incision which will heal quickly without excessive scar formation.

The scalpel according to the invention has many applications for all minor and dental surgery, for the surgery of the ear, nose and throat, for veterinary practice and other fields of surgery where space is limited and delicacy and precision are essential.

The accompanying drawing illustrates, by way of example, an embodiment of a scalpel according to the invention.

Fig. 1 is a side elevation of the scalpel, some parts being broken away,

Fig. 2 is a back view of the upper portion of the scalpel, and

Fig. 3 is a sectional view on the line A—B of Fig. 1, on a somewhat enlarged scale.

The instrument consists of the shaft or handle $a$, the neck $b$ and the blade $c$, all of which are preferably made in one piece of stainless steel. The blade $c$ ends in an extremely fine needle-like point $d$ into which merges the cutting edge $f$ of the blade. This edge is concave and extends along a quarter oval arc. Preferably, the edge is ground concavely on both its sides throughout its entire length. The blade $c$ has on its back $c'$ two longitudinally extending grooves $g$ through which blood and pus can freely drain away out of the inflamed area when lancing and cutting this area.

As indicated in broken lines on Fig. 3, a perforation may be made in the web between the grooves $g$ to form a communication through which pus or the like may pass from one groove into the other.

The neck $b$ of the scalpel may be straight as shown, or it may be curved or cranked for allowing it to be used for areas that are difficult to reach.

What we claim is:

1. A scalpel comprising a blade terminating in a needle-like point substantially in the longitudinal axis of the scalpel and having a cutting edge extending toward the point along a concave, partially oval line which gradually approaches the longitudinal axis and merges into the point.

2. A scalpel as claimed in claim 1, with which the back of the blade has at least one longitudinal groove substantially opposite the merging of the cutting edge with the point.

References Cited in the file of this patent

UNITED STATES PATENTS

| 1,960,889 | Benedict | May 29, 1934 |
| 2,649,860 | Royer | Aug. 25, 1953 |

FOREIGN PATENTS

| 4,160 | Great Britain | June 15, 1901 |

OTHER REFERENCES

"Surgical Equipment" (Madison, Wisconsin), vol. 2, No. 3, May-June 1935, page 10.